United States Patent [19]

Day

[11] 4,338,021
[45] Jul. 6, 1982

[54] IMAGING APPARATUS

[75] Inventor: Pierce B. Day, Pittsford, N.Y.

[73] Assignee: Eastman Kodak Company, Rochester, N.Y.

[21] Appl. No.: 232,086

[22] Filed: Feb. 6, 1981

[51] Int. Cl.³ ............................................. G03B 27/48
[52] U.S. Cl. ........................................ 355/49; 355/51
[58] Field of Search ................ 355/47, 48, 49, 50, 355/51, 104

[56] References Cited

U.S. PATENT DOCUMENTS

| | | | |
|---|---|---|---|
| 2,227,110 | 12/1940 | Stuart | 355/49 |
| 3,052,155 | 9/1962 | Hurin et al. | 355/51 |
| 3,130,631 | 4/1964 | Murata | 355/48 |
| 3,609,028 | 9/1971 | Egnaczak et al. | 355/3 P |
| 3,628,859 | 12/1971 | Zucker | 355/8 |
| 3,703,335 | 11/1972 | Hoffman et al. | 355/51 |
| 3,730,620 | 5/1973 | Jackson | 355/51 |

Primary Examiner—Monroe H. Hayes
Attorney, Agent, or Firm—G. Herman Childress

[57] ABSTRACT

A document drum and a transparent drum are mounted on a common shaft. The two drums are coaxial with each other and with the shaft. An optical system is provided for forming an image of a slit-like rectangular area of a document mounted on the external surface of the document drum onto a similar slit-like imaging area on the imaging drum. The optical system comprises a first mirror for reflecting light rays from the document drum to a lens, and second and third mirrors for reflecting light rays from the lens through the transparent drum. The optical axis of the lens is tilted relative to the light paths of the first mirror and the second mirror so that the light rays can be directed around the shaft.

4 Claims, 2 Drawing Figures

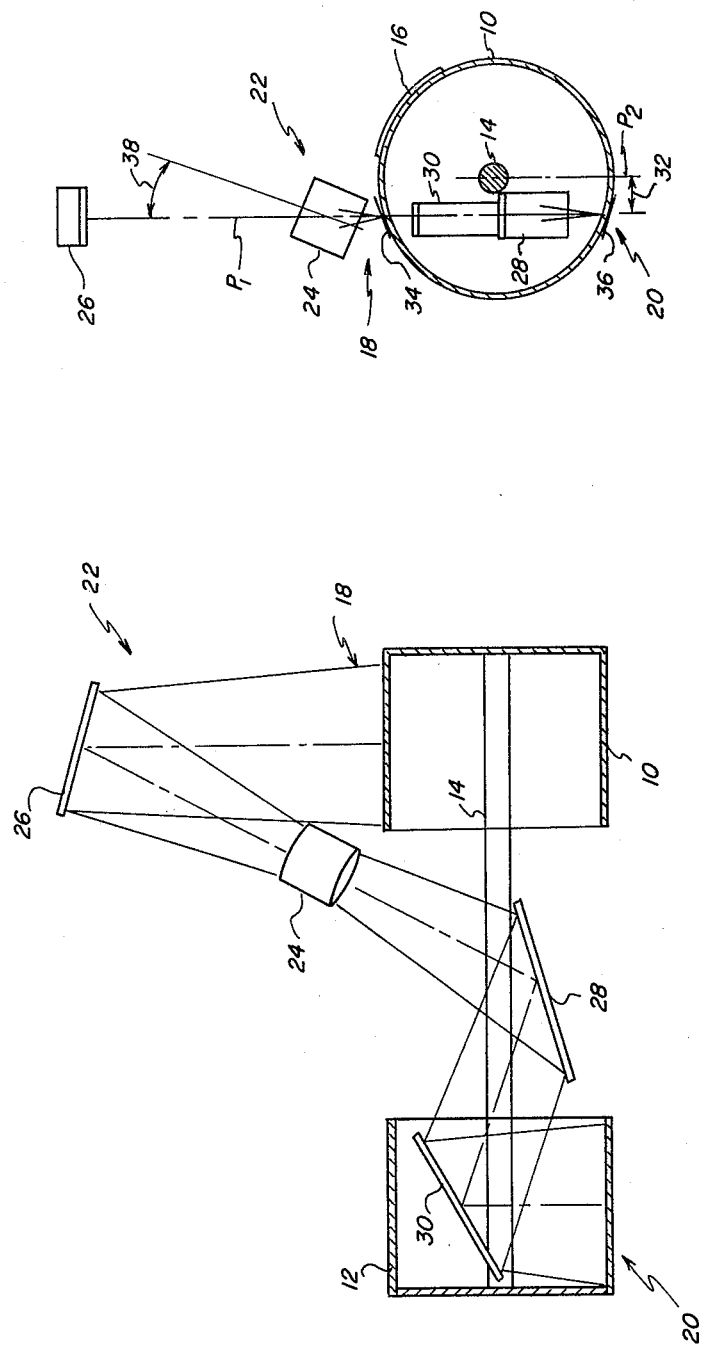

IMAGING APPARATUS

BACKGROUND OF THE INVENTION

1. Field of the Invention

This invention relates to imaging apparatus useful, for example, in a double-drum migration imaging copier/duplicator which has a document drum and a transparent drum rotatable about a common axis and driven by a common drive shaft located along such axis. The imaging apparatus of this invention forms an image of a document mounted on the document drum onto the transparent drum without interference from the drive shaft by using only three mirrors and a tilted lens.

2. Description of the Prior Art

It is known to provide a cylindrical drum for carrying a document on the outer surface thereof and to project, by means of a lens and mirrors, an image of a rectangular slit-like portion on that document through an injecting electrode in the form of a transparent cylinder to the outer surface of the electrode cylinder. Then the resulting image is developed by a photoelectrophoretic process. For example, disclosures of such apparatus can be found in U.S. Pat. Nos. 3,628,859, 3,703,335 and 3,730,620. In these patents two separate lens and optical systems are provided, and the document drum and transparent electrode drum are rotated simultaneously by apparatus not located along the axis of rotation of the drums.

The need for two optical systems is expensive and complicated, and it would be desirable to drive both drums from a common drive shaft coaxial with the drums if such could be accomplished without the shaft interferring with principal light rays of the optical system. U.S. Pat. No. 3,609,028 also describes a machine for automatically producing images by means of a photoelectrophoretic process. In this machine a transparent cylindrical electrode receives an image from a mirror located inside the electrode and coaxial with the axis of rotation of the electrode. An image on a film strip is projected onto the mirror and reflected through the electrode. Thus the object drum is eliminated and there is no problem with reflecting light rays through an optical system in a manner which avoids a drive shaft.

U.S. Pat. Nos. 3,052,155 and 3,130,631 disclose driving document and image transport members from common drive means in order to obtain equal linear speeds for the document and an image receiver. However the related imaging apparatus disclosed in such patents can be easily arranged to avoid interference from drive shafts.

SUMMARY OF THE INVENTION

In accordance with the present invention a migration imaging copier/duplicator includes a document drum with a cylindrical outer surface for receiving a document to be copied and a transparent imaging drum with a generally cylindrical outer surface. A shaft is coupled to the document drum and imaging drum to simultaneously rotate both of the drums about the axis of the shaft. Apparatus is provided for imaging a rectangular area of a document on the document drum through the imaging drum and onto the outer surface of the imaging drum so that the image thus produced can be processed and transferred to a sheet of paper or the like. The imaging apparatus includes a lens that is located relative to the shaft so that the shaft is outside the path of the principal light rays through the lens. In a preferred embodiment three mirrors are provided, one of which reflects light rays from the document drum to the lens and second and third mirrors reflect light rays from the lens onto the imaging drum. In the preferred embodiment, the optical axis of the lens is tilted relative to the light path between the first mirror and the second mirror so that the light rays are directed around the shaft without interference from the shaft.

BRIEF DESCRIPTION OF THE DRAWINGS

In the detailed description of the preferred embodiment of the invention presented below, reference is made to the accompanying drawings, in which:

FIG. 1 is a view, partially in cross section, illustrating a preferred embodiment of the imaging apparatus of the present invention; and FIG. 2 is an end view of the apparatus shown in FIG. 1.

DESCRIPTION OF THE PREFERRED EMBODIMENT

Referring now to the drawings in detail, a migration imaging copier/duplicator comprises a cylindrical document drum 10 and a cylindrical transparent imaging drum 12. The two drums have the same diameter for a unit magnification copier/duplicator as illustrated in the drawings, and the drums are coaxially positioned in spaced relation to each other. The before-mentioned patents disclose a similar arrangement for the drums, and describe in detail the migration imaging copying process. In accordance with the present invention, the two drums are both attached to a rotatable drive shaft 14. The shaft extends through the drums and is coaxial with both of the drums. Shaft 14 drives both of the drums at the same angular velocity during operation.

A document 16 to be copied is placed on the outer surface of drum 10 and rotated by operation of shaft 14 past an exposure station 18 where the document is illuminated by lamps (not shown) in a conventional manner. The imaging apparatus of the present invention provides an image of a generally rectangular, slit-like portion of the document at station 18 through the transparent imaging drum 12 and to an image station 20 at the outer surface of the drum 12. An image of the document at the station 18 is provided to the imaging station 20 by an optical system generally designated 22 which comprises a lens 24 and three mirrors 26, 28 and 30. More specifically, light reflected from the illuminated document 12 at station 18 is reflected by mirror 26 through lens 24 and onto mirror 28. Mirror 28, in turn, reflects light from the lens onto the mirror 30 which is located inside the transparent drum 12 and arranged relative to mirror 28 so that light rays received from mirror 28 are reflected onto the inner surface of the drum 12. The light rays then pass through the transparent drum to the imaging station 20.

Ordinarily the shaft 14 would interfere with proper imaging of the object onto the imaging plane. In order to avoid this problem, the lens 24 is tilted and the object and image planes are offset from the axis of the shaft 14. More specifically, as shown in FIG. 2, a plane $P_1$ passing through the center of the mirrors 26, 28 and 30 and through the center of the lens 24 is offset relative to a plane $P_2$ parallel to and passing through the axis of the shaft 14. The offset is designated 32 in FIG. 2, and the extent of the offset is such that the principal light rays emanating from the object plane 34 in the exposure station 18 bypass the shaft 14 as they travel to the image plane 36 in the imaging station 20. Because plane P of the optical system is offset as shown at 32, the object plane 34 and the image plane 36 are tilted in the directions indicated to minimize any focusing error across the width of the slit image. The required tilt is obtained by tilting the axis of the lens 24 relative to plane $P_1$, as shown in FIG. 2, by the angle designated 38. The tilt of the object plane 34 and the image plane 36 are equal and in the opposite direction, as shown in FIG. 2.

The magnitude of the offset 32 and the tilt angle 38 are shown exaggerated in the drawing in order to facilitate the illustration thereof. In practice the specific offset used is preferably just sufficient for the principal light rays to clear the drive shaft 14. By way of example, the offset 32 might be about two and one-half centimeters or one inch, so that the lens tilt and field angle required would be in the order of about 6° in a direction normal to the slit at the exposure station 18. The length of the slit and the lens focal length define the field angle in the direction parallel to the slit. For a 33 centimer (13 inch), f/5.2 lens the semi-field angle is about 11°.

The present invention provides a relatively simple imaging apparatus for a migration imaging copying apparatus in which the document drum and the transparent drum are directly connected to a central shaft in order to insure conjoint movement of the two drums. A number of advantages are achieved by the apparatus of the invention. For a given transparent drum diameter, the offset optical system described effectively circumvents the restricted width of document coverage in double-drum systems having a common, connecting shaft. For example, assuming the drums have a diameter of about 31.75 centimeters or 12.5 inches, the offset optical system of the invention can scan a document that is 21.6 centimeters or 8.5 inches wide, whereas other optical systems may be able to scan only about 6.35 centimeters or 2.5 inches of the document width. In addition, the offset optical system described herein requires only three mirrors while other systems required to deviate the light beam around the shaft 14 require a minimum of seven mirrors.

The invention, and its objects and advantages, will become more apparent in the detailed description of the preferred embodiment presented below.

I claim:
1. A migration imaging copier/duplicator comprising:
    a document drum having a generally cylindrical outer surface for receiving a document to be copied;
    a transparent imaging drum having a generally cylindrical outer surface;
    a shaft coupled to said document drum and said imaging drum for simultaneously rotating said drums, said drums being coaxial with each other and with said shaft; and
    an optical system for imaging a rectangular area of a document on the document drum through the imaging drum and onto the outer surface of the imaging drum, the optical system being offset from the shaft so that the shaft is outside the path of the principal light rays through the optical system.
2. The invention as set forth in claim 1 wherein the optical system comprises a lens and three mirrors located in a plane offset from the axis of the shaft.
3. The invention as set forth in claim 2 wherein the lens has an axis that is tilted relative to said plane.
4. In an imaging apparatus for a migration imaging copier/duplicator having a document drum and an imaging drum directly driven by a common shaft, the drums being coaxial with each other and with the shaft, the apparatus comprising:
    a lens having an optical axis;
    a first mirror for reflecting light rays from the document drum to the lens;
    a second mirror and a third mirror for reflecting light rays from the lens onto the imaging drum; and
    the optical axis of the lens being tilted relative to the light path between the first mirror and the second mirror so that light rays are directed around the shaft.

* * * * *